Aug. 14, 1928.

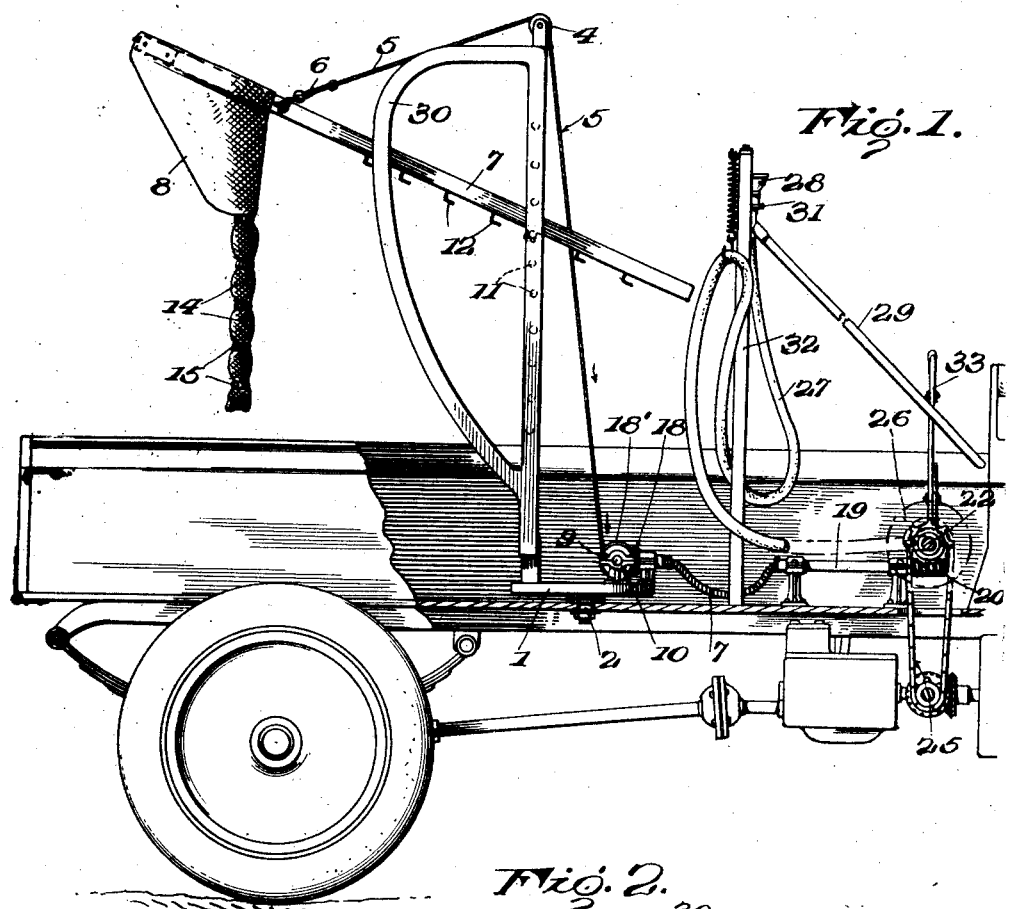
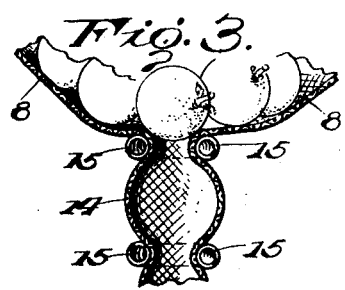

C. W. WOOD 1,680,925

FRUIT GATHERER

Filed Dec. 29, 1923     3 Sheets-Sheet 2

INVENTOR

BY

ATTORNEYS

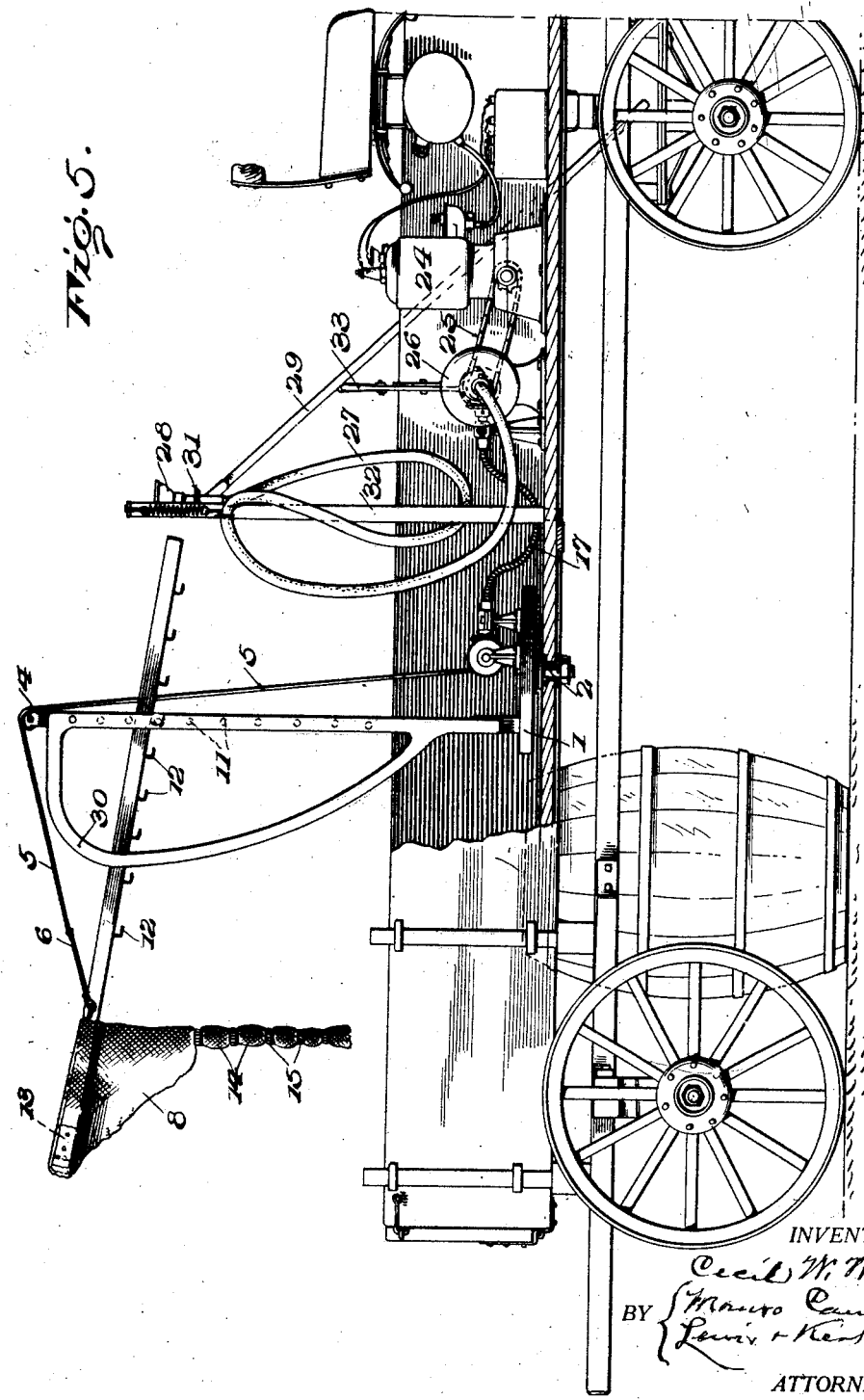

Patented Aug. 14, 1928.

1,680,925

UNITED STATES PATENT OFFICE.

CECIL W. WOOD, OF HEDGESVILLE, WEST VIRGINIA.

FRUIT GATHERER.

Application filed December 29, 1923. Serial No. 683,466.

This invention relates to the art of gathering fruit such for example as apples, oranges and the like, and has for its object to perform the operation of gathering the fruit from the tree mechanically as a substitute for hand picking which is slow and expensive.

It is essential, in gathering fruit for shipment, that the fruit should be handled in such a way as to avoid any possibility of bruising the fruit, since a bruise of any kind results in premature decay.

The present invention consists of means for presenting a hopper in a position to receive the fruit as it is separated from the tree, and conducting it to a suitable receptacle such as a barrel, which receiving means is of such a character that it may be readily adjusted between crowded branches of a tree, raised or lowered to put it in close proximity to the fruit to be separated, and shifted to the right or the left for the purpose of properly positioning it under the fruit while on the tree. Such fruit-receiving means is preferably in the form of a suitable hopper carried on a collapsible frame, whereby the same may be readily inserted between the branches, and universally mounted to the end that it may be raised and lowered or adjusted in a horizontal plane. In the preferred form, the hopper frame is mounted on a support, such as a mast, which support may be turned around a vertical axis to adjust it horizontally. Furthermore, the hopper frame is so mounted upon the mast or other suitable support that it may be adjusted in a vertical plane and may also be adjusted radially toward or from said mast or other support.

The fruit-separating means operating in combination with this hopper may be any means capable of causing fruit to separate from the tree, but preferably, and as here shown, it is in the form of an air blast, and preferably a whirling air blast, directed upon the fruit as it hangs upon the tree.

The novel hopper and mounting may, however, be used with other forms of separating means than those shown in the drawings, since said hopper and mounting have distinctive features that are of value and importance regardless of the character of the fruit-separating means employed, and, in fact, regardless of whether fruit-separating means are combined therewith or not.

The fundamental ideas involved in the invention may receive a variety of mechanical expressions, one of which, for the purpose of illustrating the invention, is shown in the accompanying drawings, but it is to be distinctly understood that such drawings are for purposes of illustration only and not for defining the limits of the invention, reference being had to the appended claims for that purpose.

In said drawings:—

Fig. 1 is a vertical elevation of the apparatus here shown as mounted upon a truck and driven from the truck motor;

Fig. 2 is a detail view illustrating the collapse of the fruit-receiving hopper in order that the same may be inserted between the branches of a tree;

Fig. 3 is an enlarged detail in section of the hopper and delivery spout;

Fig. 5 is a side elevation partly in section showing the apparatus mounted upon a wagon body together with a motor for operating the same.

Figure 4:
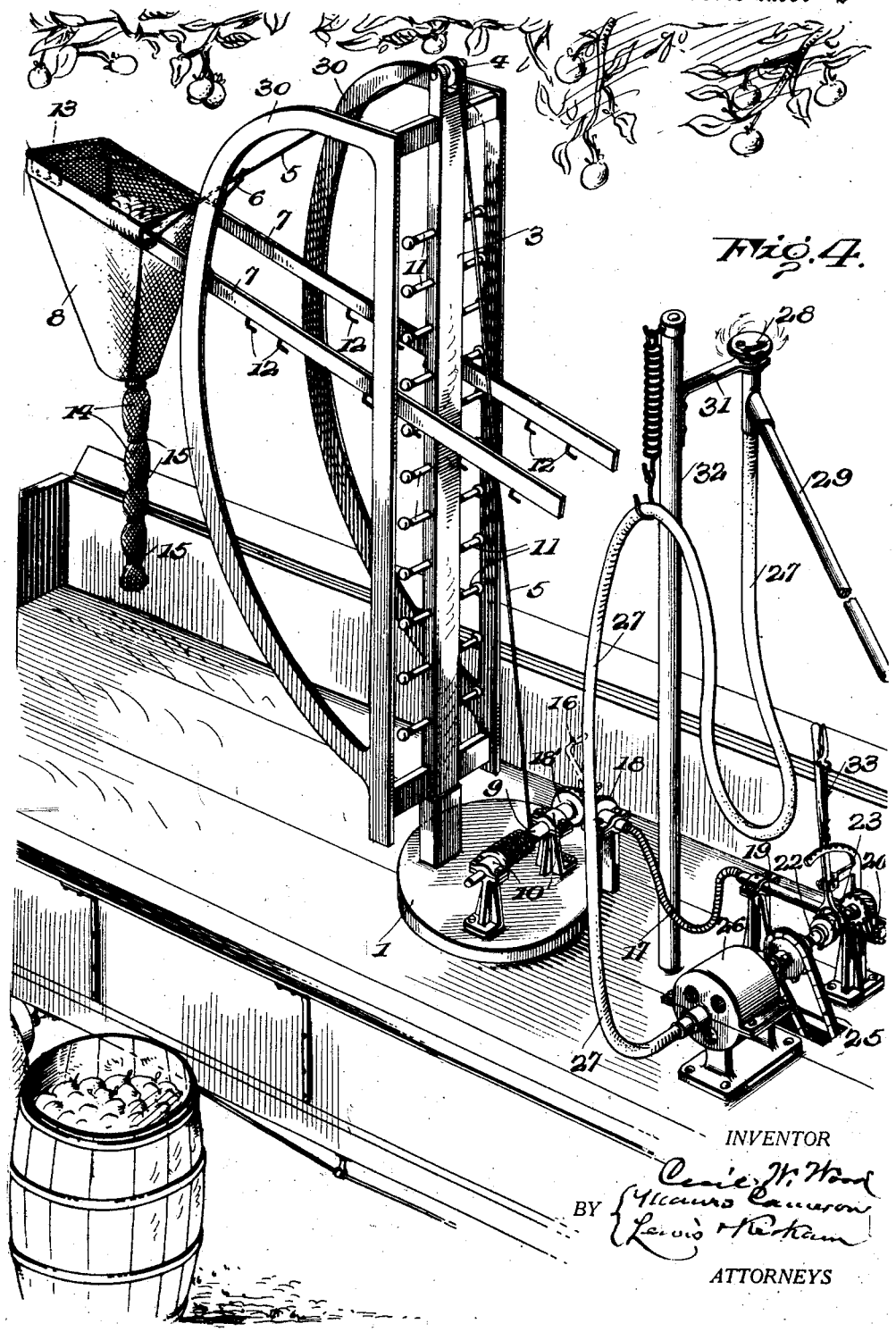
Fig. 4 is a perspective view of the device.

Referring to the drawings, in which like reference numerals indicate like parts throughout the several views, 1 is a base plate preferably of disk form mounted to turn on an axis 2 in any suitable support, as for example the floor of a wagon or truck bed. Eccentrically mounted on the base plate 1 is a mast 3 having at its upper portion a pulley 4 over which passes a line 5 having at its outer end a bridle 6 secured to the side bars 7, 7 constituting a part of the framework supporting the hopper 8 of suitable fabric, as canvas. The other end of the line 5 is secured to a windlass 9 mounted in suitable bearings 10, 10 carried by the base disk 1.

The mast 3 is provided on its opposite sides with abutments or shoulders here shown in the form of pins 11 projecting outwardly therefrom, and the side bars 7 are provided with abutments or shoulders shown as hook-like attachments 12 which engage the pins 11 on the mast thereby holding the bars projecting outwardly from the mast. The pins 11 serve as axes around which the bars 7 can turn and the length of the bars beyond the pins can be adjusted by means of the hooks 12. The two bars 7, 7 are connected together at their outer ends by a cross-bar 13, Fig. 2, which bar is hinged to the side bars, as by leather hinges, as will be thoroughly understood from an inspection of Fig. 2. By advancing one of the bars 7 and withdrawing the other one as shown in full lines in Fig. 2, the two bars, by reason of the hinged connection, may be brought much closer together at the outer ends. The hopper 8 is attached to the crossbars 7 and the end bar 13, and at its inner edge is stretched across from one of the bars 7 to the other bar 7. By this means the bars may be brought close together at their outer ends and the hopper collapsed to facilitate insertion of the same between the branches of a tree. This hopper is provided with a restricted downwardly extending spout 14 provided with means for interrupting the fall of the fruit through the spout, such means being here shown in the form of yielding restricting members 15, around the spout at suitable intervals. These restricting members 15 are preferably made of coiled wire springs (see Fig. 3) and are of such diameter as to engage and interrupt the fall of the fruit downwardly through the spout until sufficient weight of fruit above the lowermost piece has accumulated to expand the restricting members 15, when the latter will open and permit the fruit to descend to the next restricting member, which in turn is opened by the weight, and so on downward until the last member 15 is opened, when the fruit in the spout escapes into a suitable receptacle, as a barrel.

The windlass 9 may be operated by hand by means of a crank 16 (Fig. 4), or, if desired, may be driven by power. As here shown, 17 is a flexible shaft, connected by suitable bevel gears 18, 18′ to the windlass. The flexible shaft 17 is secured to and forms an extension of a shaft 19, having a worm 20 thereon, which meshes with worm-gear 21 on a shaft 22. On the shaft 22 is any suitable clutch mechanism 23 whereby the shaft 22 may be thrown into or out of operation as desired. Shaft 22 is driven from any suitable motor, as, for example, a gasoline engine 24 (Fig. 5), or the motor of the motor truck as in Fig. 1, connection being made between the motor and the shaft through any suitable driving member, as sprocket chain 25. This same shaft 22 is also used as the driving shaft of an air-compressor 26, which may be of any suitable or ordinary construction, for delivering said blast of compressed air to a long flexible hose 27, having on the end thereof any suitable nozzle for delivering a blast of air. As here shown (see Fig. 4), this is in the form of a nozzle 28 delivering a whirling blast. The nozzle 28 is secured to the end of a long light pole 29 by means of which the operator is enabled to direct a blast of air against the fruit as, for example, apples while the hopper 8 is supported thereunder.

*Operation.*—As will be readily understood, the mechanism may be mounted on any suitable platform and if, as here shown, the same is mounted on the bed of a truck or wagon, the same is driven along the side of a tree and, by turning the mast 3 around the vertical axis 2 of the disk 1, the hopper is brought under the fruit to be gathered. The bars 7, 7 supporting the hopper 8 can be extended any desired distance by disengaging the hooks 12 from the pins 11 and pushing the bars outwardly or drawing them inwardly, as may be necessary, the elevation of the hopper being determined by two factors, to wit, the height of the particular pins 12 upon which the bars engage and by the adjustment of the line 5 through the windlass 9. The pins 11 constitute axes about which the bars 7, 7 turn as the line 5 is lengthened or shortened through the windlass. It will therefore be seen that the hopper is universally mounted, being able to turn around the vertical axis 2 of the disk or bed-plate 1 and around the axes afforded by the pins 11; also that the height of the hopper can be adjusted so as to accommodate itself to the lower limbs of the tree as well as those higher up. In order to avoid a too great lateral movement of the bars 7, 7, together with the hopper 8, when adjusted to any given position, such lateral movement is limited by side braces 30, 30.

The hopper having been adjusted to the desired position, the operator removes the nozzle 28 from the bracket 31 carried by the mast 32 and holds it in position to deliver the blast to the fruit. A strong direct blast would be sufficient in most cases to disconnect the fruit from the tree, but as here shown a whirling blast is employed which gives a twisting action to the fruit. The fruit, being disconnected, falls by gravity into the hopper while the air blast serves to blow away the leaves that may have also been disconnected and thereby prevent their falling in any great number into the hopper.

The manipulation of the hopper, to turn it in a vertical plane around the axes constituted by the pins 11, 11, is effected through the windlass 9. This windlass, as before stated, can be operated through the crank 16 by hand or preferably through the clutch-operating lever 33 which is of the usual or ordinary construction, whereby the hopper is raised or lowered to the desired position. This having been accomplished, the clutch is thrown out and the hopper remains in adjusted position by reason of the locking action effected between the worm 20 and the worm gear 21.

As the fruit falls into the hopper, the individual fruit, such for example as the first apple, descends to the lower delivery end of the hopper; in other words, to the upper end of the spout 14. The weight of an individual apple is insufficient to open the yielding restricting members 15 far enough to permit the apples to pass through, but as weight accumulates above it, this weight operates to expand the yielding member 15 to permit the apple to pass the first yielding member, when it drops until it comes into contact with the second yielding member, and so on until it passes entirely through the spout. This accumulation of weight only occurs after a considerable quantity of apples have gathered in the hopper and, before this has occurred, the hopper 8 is turned around the axis 2 and the delivery end of the spout placed within a barrel, when the weight of the fruit therein serves to open all of the yielding members 15 and deliver the greater portion of the fruit into the barrel. This having been accomplished, the hopper is again returned to the proper position for gathering more fruit.

It will be readily perceived by those skilled in the art that the invention may be embodied in a variety of forms differing in precise mechanical construction from that shown in the drawings. For example, other mountings might be employed for imparting the necessary movements to the hopper to bring it under the fruit, and means other than spray nozzles could be employed for separating the fruit from the tree, all of which is within the spirit of the present invention.

What is claimed is:—

1. In a fruit gatherer, the combination of a turn-table mounted on a vertical axis, a mast mounted on said table, a collapsible hopper mounted to turn around a horizontal axis on said mast, a windlass on said turn-table, and a line supported on said mast and connected at its opposite ends with the hopper and said windlass.

2. In a fruit gatherer, the combination of a turn-table, a mast mounted on said table and having pairs of oppositely disposed shoulders vertically spaced thereon, a pair of flexibly connected outwardly extending bars extending on opposite sides of said mast, said bars having a series of spaced elements for engaging the shoulders on the mast, a hopper supported between said bars, and means for raising and lowering the outer ends of said bars.

3. In a fruit gatherer, the combination of a mast, a pair of bars fulcrumed on said mast in parallel relation and flexibly connected at their outer ends, a hopper supported between said bars, and means turning said bars in a vertical plane around their fulcrum.

4. In a fruit gatherer, the combination of a vertical mast, a plurality of pairs of fulcrums disposed at different heights on said mast, a pair of bars in parallel relation and turning one on each member of one of said pairs of fulcrums, a hopper supported between said bars, and means moving said hopper in a vertical plane.

5. In a fruit gatherer, the combination of a vertical mast, a pair of parallel bars each independently fulcrumed on said mast, means flexibly connecting the outer ends of said bars, a hopper supported between the bars, means whereby the lengths of the lever arms of said bars may be independently adjusted, and means moving said bars around their fulcrums.

6. In a fruit gatherer, the combination of a mast, a pair of independently adjustable bars each fulcrumed on said mast, a hopper supported by said bars between the same and means moving said hopper in a vertical plane.

In testimony whereof I have signed this specification.

CECIL W. WOOD.